Nov. 2, 1926.
W. H. NOELTING ET AL
1,605,272
LOCKING ARRANGEMENT FOR WING TYPE CASTER BRACKETS
Filed June 23, 1924    2 Sheets-Sheet 1
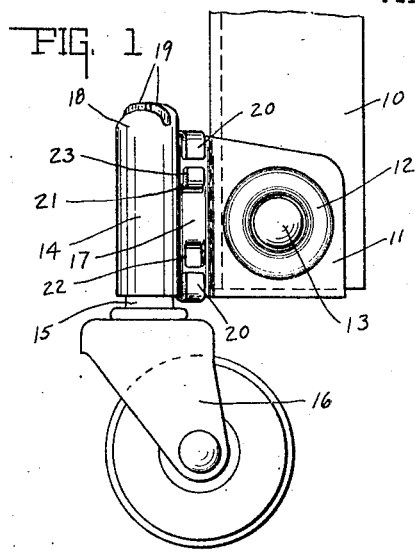
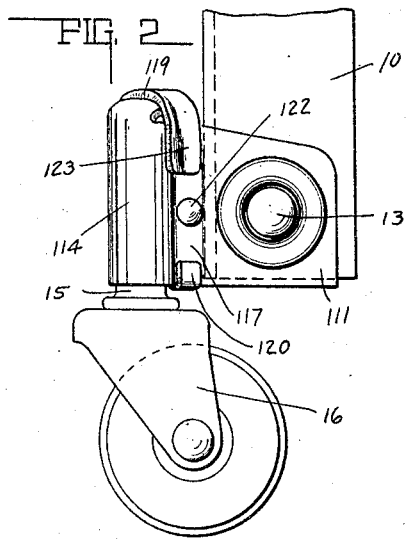
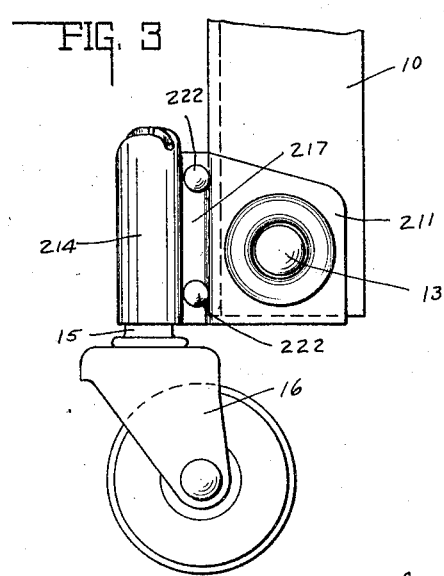
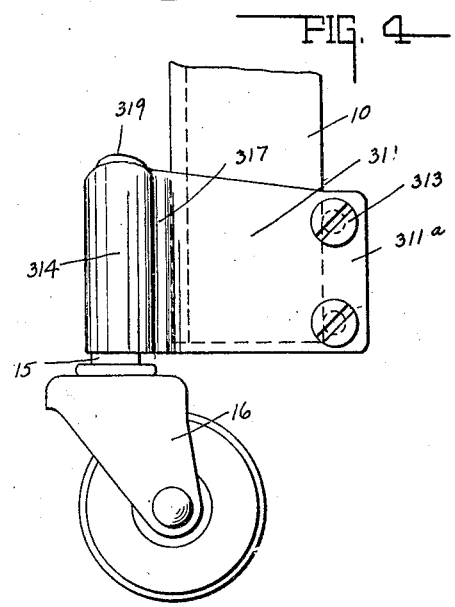
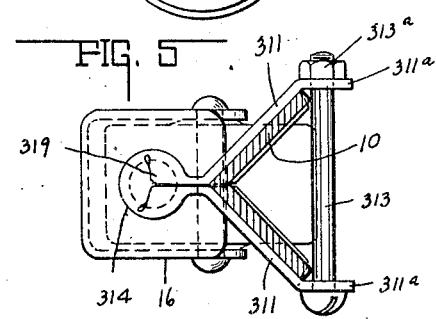
INVENTORS.
WALTER W. NOELTING.
WILLIAM H. NOELTING.
EMIL A. SMITHFIELD.
BY
ATTORNEYS.

Nov. 2, 1926.  1,605,272
W. H. NOELTING ET AL
LOCKING ARRANGEMENT FOR WING TYPE CASTER BRACKETS
Filed June 23, 1924   2 Sheets-Sheet 2
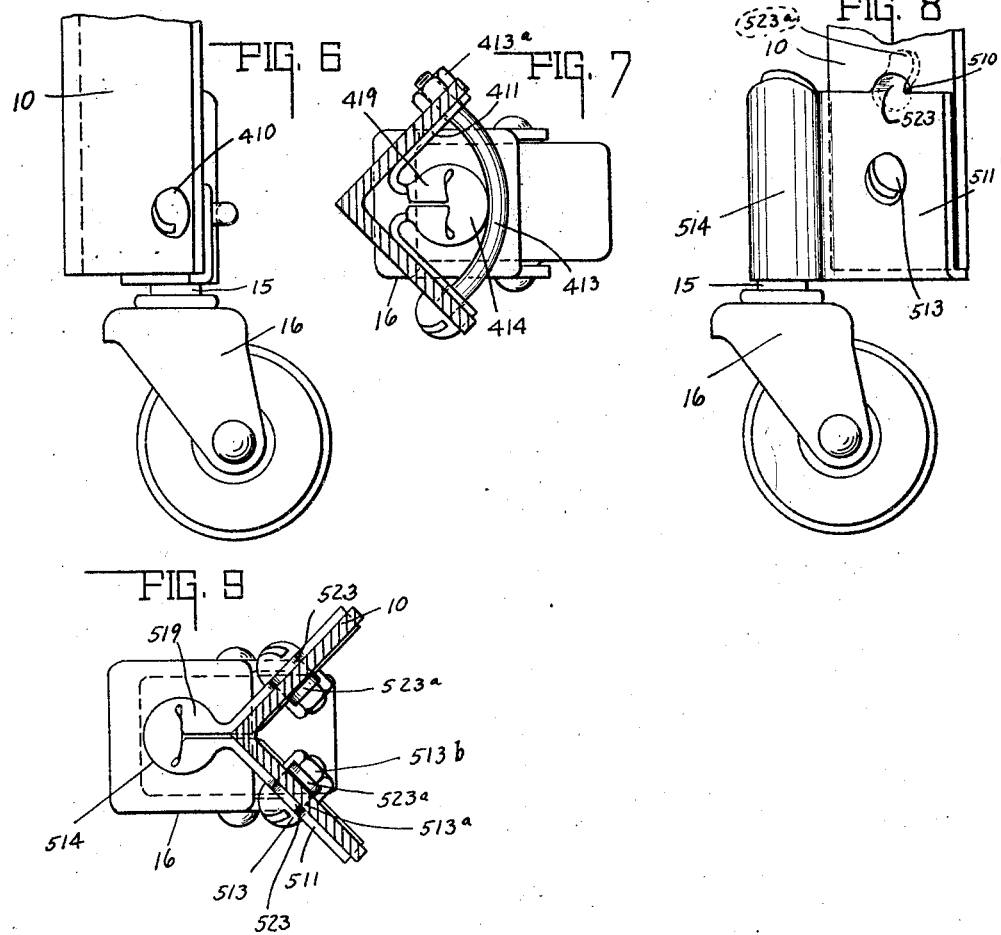
INVENTORS.
WALTER W. NOELTING.
WILLIAM H. NOELTING.
BY   EMIL A. SMITHFIELD.
ATTORNEYS.

Patented Nov. 2, 1926.

1,605,272

UNITED STATES PATENT OFFICE.

WILLIAM H. NOELTING, WALTER W. NOELTING, AND EMIL A. SMITHFIELD, OF EVANSVILLE, INDIANA, ASSIGNORS TO FAULTLESS CASTER COMPANY, OF EVANSVILLE, INDIANA, A CORPORATION.

LOCKING ARRANGEMENT FOR WING-TYPE CASTER BRACKETS.

Application filed June 23, 1924. Serial No. 721,821.

This invention relates to an improvement upon that type of caster bracket socket shown in the Patent No. 1,383,773, dated July 5, 1921, and for convenience the invention herein disclosed is shown associated with the particular form of bracket shown in Figs. 1 to 4 inclusive of the before-mentioned patent, although it is to be distinctly understood that the invention may also be associated with any other forms of similar brackets including those shown in Figs. 5 to 11 inclusive of said before-mentioned patent.

It has been determined that under extreme load there is a spreading or opening between the longitudinal edges forming the single longitudinal opening of the tubular socket of the before-mentioned patent; and the purpose of the present invention is to prevent such spreading since the tubular socket is adapted to contain a caster stem and be yieldingly retained therein. If the socket is deformed by reason of the spreading action occasionally encountered, the caster may not be retained in the socket by the usual retaining means or any other desired means.

The before-mentioned patent illustrates a depending tongue engagement with the reduced neck of a caster. It is also to be understood that the caster stem may be provided with a shallow groove, and this shallow groove is adapted to receive a relatively wide yielding band which is adapted to project into engagement with the tubular wall of the socket and thus detachably retain the caster stem in the tubular socket.

The chief feature of the invention consists in the securing or interlocking of the portions adjacent the two longitudinal edges defining the single longitudinal opening of the tubular socket.

The full nature of the invention will be understood from the accompanying drawings and the following description and claims:

In the drawings, Fig. 1 is a side elevational view of a single iron leg showing one form of caster bracket socket and a caster associated therewith. Fig. 2 is a similar view of a modified form of the invention. Fig. 3 is an elevational view of still a further modified form of the invention. Fig. 4 is a side elevational view of another form of the invention. Fig. 5 is a top plan view thereof. Fig. 6 is a side elevational view of a further form of the invention. Fig. 7 is a top plan view thereof. Fig. 8 is a side elevational view of another form of the invention. Fig. 9 is a top plan view thereof.

In the drawings 10 indicates an angle iron leg which includes two sides positioned at an angle to each other and not necessarily at right angles or at 180 degrees, but may be positioned at any angle. Adjacent each face of the angular leg, there is positioned a clamping plate 11, which is herein illustrated as provided with a circular embossment 12 defining an aperture adapted to receive suitable securing means, such as the bolts or rivets 13, whereby the entire caster bracket is secured to the leg for supporting the same and is supported by said leg. Each of the clamping portions 11 is provided with a bottom flange, such as shown in the before-mentioned patent. The type of wing may be constructed in any other manner as desired.

There is provided a tubular socket 14 which herein is shown cylindrical in form and within the same is detachably supported a caster pintle 15 carrying a caster 16.

The tubular socket 14, it is to be understood, includes a pair of adjacent and substantially parallel longitudinal edges defining a single longitudinal opening. Said edges are connected by connecting portions 17 with the clamping plates or wings 11. As shown in the before-mentioned patent, the head of the tubular socket is formed closed, and herein the same is formed by the inturned tongue 18 which may or may not extend downwardly within the tubular socket and form a caster stem engaging member as shown in the before-mentioned patent. The cap portion 18, however, is herein shown reenforced by the cap-forming flaps 19 substantially similar to those disclosed in the before-mentioned patent. Herein one or both if desired of the connecting portions 17 are provided with an extension or tongue 20. This tongue is turned over the other portion 17, and thus serves to lock the two portions 17 together and thus lock the longitudinal edges together and prevent opening movement between the same. As shown clearly in Fig. 1, both tongues are positioned upon one of the connecting portions 17 and extend laterally of the other, and thence parallel thereto in clamping relation, the lower tongue extending upwardly and the upper tongue extending downwardly. It is, of course, to be understood that the tongues may be oppositely directed; that is, one carried upon each of the connecting portions 17 and lie parallel to and clampingly engage the other connecting portion.

If desired, the connecting portions 17 may be slotted at 21 and as shown at 22, the adjacent connecting portion may be somewhat similarly slotted to provide a tongue 23 receivable by the slot 21. This tongue 23 is adapted to be turned angularly, either upwardly or downwardly as desired, but preferably is turned oppositely from the opening from which it is formed, thereby providing additional locking means. It will also be understood that if desired the before-mentioned construction may be otherwise positioned, and in this event the tongue portion or portions will lie concentric with the tubular portion 14 or may lie parallel to the angular sides or may lie in either direction previously mentioned, or both, as found desirable.

In Fig. 2 there is illustrated a modified form of the invention which includes the usual bracket 111 having the tubular socket portion 114. If, however, one of the flaps 19 is omitted, the other flap 119 is extended as shown in this figure, and the same constitutes a locking portion 123, and said extension also forms a reenforcing cap. The two connecting portions 117 may also be secured together by an upturned locking member 120. If desired, the connecting portions 117 may be provided with a pair of registering openings, and these openings receive suitable locking means in the form of rivets or bolts 122.

In Fig. 3 a rather simple form of the invention is illustrated, and in this form of the invention the tubular socket 214 includes a plurality of supporting wings 211 connected thereto by the connecting portions 217, and herein a plurality of rivets or equivalent means 222 is provided for securing said connecting portions together.

In Figs. 4 and 5 there is illustrated another form of the invention, and herein the tubular socket 314 is provided with the caps 319 and the longitudinal portions 317 adjacent the single longitudinal edge of the tubular socket 314 are connected to the wing portions 311. The wing portions 311 are extended as at 311$^a$ and are suitably apertured. A bolt 313 having the nut 313$^a$ serves to clamp the two wing portions 311 against the angular leg 10 and thus prevent any opening movement of the socket.

In that form of the invention illustrated in Figs. 6 and 7, the angle iron 10 is shown provided with openings and a curved bolt 413 secured by a nut 413$^a$ anchors the wings 411 of the bracket to said leg and simultaneously prevents opening movement beyond that desired of the tubular socket portion 414 having the reenforcing caps.

In Figs. 8 and 9 there is illustrated a still further form of the invention which includes the tubular socket 514 having the wing portions 511. Said wing portions are apertured as at 513 to receive the bolts 513$^a$ which carry the securing nuts 513$^b$. The leg 10 is herein shown provided with an opening 510, and extending from the wing 511 is an offset portion 523 which is provided with a lateral extension 523$^a$. This construction also prevents opening movement of the tubular socket.

The several modifications hereinbefore described each have advantages.

The invention claimed is:—

1. A caster bracket socket comprising a tubular socket including a pair of adjacent longitudinal edges defining a longitudinal opening, a pair of leg-supporting and leg-supported wings each connected to a longitudinal edge, and means securing said edges together against opening movement.

2. A caster bracket socket comprising a tubular socket including a pair of adjacent longitudinal edges defining a longitudinal opening, a pair of leg-supporting and leg-supported wings each connected to a longitudinal edge, and means integral with the bracket for securing said edges together and against opening movement.

3. A caster bracket socket comprising a tubular socket including a pair of adjacent longitudinal edges defining a single longitudinal opening, a pair of adjacent portions each connected to a longitudinal edge, and means securing said edges together against opening movement by securing said portions together.

4. A caster bracket socket comprising a tubular socket including a pair of adjacent longitudinal edges defining a single longitudinal opening, a pair of adjacent portions each connected to a longitudinal edge, and means integral with one of said portions for securing said edges together against opening movement by securing said portions together.

5. A caster bracket socket comprising a tubular socket including a pair of adjacent longitudinal edges defining a single longitudinal opening, a pair of adjacent portions each connected to a longitudinal edge, and means integral with the tubular socket and extending across the same for forming a portion of the head thereof and extended for engagement with the opposite edge connected portion for locking said portions together to secure said edges together and against opening movement therebetween.

6. A caster bracket socket comprising a tubular socket including a pair of adjacent longitudinal edges defining a longitudinal opening, a pair of leg-supporting and leg-supported wings each connected to a longitudinal edge, and means extending from wing to wing for securing said wings against opening movement.

In witness whereof, we have hereunto affixed our signatures.

WILLIAM H. NOELTING.
WALTER W. NOELTING.
EMIL A. SMITHFIELD.